United States Patent
Robota et al.

(10) Patent No.: US 12,115,526 B2
(45) Date of Patent: Oct. 15, 2024

(54) PROCESS AND APPARATUS FOR REMOVING SOLID CATALYST

(71) Applicant: Velocys Technologies Ltd, Oxford (GB)

(72) Inventors: Heinz J. Robota, Woodland, CA (US); Ravi Arora, New Albany, OH (US); Robert J. Luzenski, Port Hope, MI (US); Jason R. Robinson, Columbus, OH (US); Brendan R. White, Columbus, OH (US); Thomas Yuschak, Lewis Center, OH (US); Paul W. Neagle, Westerville, OH (US); Kai Tod Paul Jarosch, Corning, NY (US); Bin Yang, Columbus, OH (US)

(73) Assignee: Velocys Technologies Ltd., Oxford (GB)

( * ) Notice: Subject to any disclaimer, the term of this patent is extended or adjusted under 35 U.S.C. 154(b) by 233 days.

(21) Appl. No.: 17/917,941

(22) PCT Filed: Apr. 9, 2021

(86) PCT No.: PCT/US2021/026609
§ 371 (c)(1),
(2) Date: Oct. 9, 2022

(87) PCT Pub. No.: WO2021/207622
PCT Pub. Date: Oct. 14, 2021

(65) Prior Publication Data
US 2023/0117401 A1    Apr. 20, 2023

Related U.S. Application Data

(60) Provisional application No. 63/008,203, filed on Apr. 10, 2020.

(30) Foreign Application Priority Data

May 7, 2020  (GB) .................................. 2006793

(51) Int. Cl.
B01J 8/00    (2006.01)
B01J 8/02    (2006.01)
B01J 19/00   (2006.01)

(52) U.S. Cl.
CPC ............. B01J 8/004 (2013.01); B01J 8/0292 (2013.01); B01J 19/0093 (2013.01); B01J 2208/00761 (2013.01); B01J 2208/027 (2013.01)

(58) Field of Classification Search
CPC  B01J 8/004; B01J 8/0292; B01J 2208/00761; B01J 2208/027; B01J 2219/0093
See application file for complete search history.

(56) References Cited

U.S. PATENT DOCUMENTS

2009/0252658 A1   10/2009  Ramler et al.

FOREIGN PATENT DOCUMENTS

| CN | 104959093 A | 10/2015 |
| WO | 2008030467 A2 | 3/2008 |
| WO | 2016201218 A2 | 12/2016 |

OTHER PUBLICATIONS

International Preliminary Report on Patentability for related International Application No. PCT/US2021/026609 mailed Oct. 20, 2022.

(Continued)

Primary Examiner — Lessanework Seifu
(74) Attorney, Agent, or Firm — Renner, Otto, Boisselle & Sklar, LLP (57) ABSTRACT

Spent catalyst (500) is removed from process microchannels (310) of a Fischer-Tropsch reactor by directing a jet of air (4) from an air knife (1) through slots of a protecting member (Continued)

(2). The air knife is traversed across successive rows of process microchannels (310) in direction A. The spacer member (2) protects an internal microchannel architecture (315) of the process microchannels against damage by the air jet (4) which may approach or exceed sonic velocity as it is directed into the process microchannels.

18 Claims, 4 Drawing Sheets

(56) References Cited

OTHER PUBLICATIONS

Combined Search and Examination Report for related Great Britain Application No. GB2006793.0 dated Oct. 26, 2020.
International Search Report for related International Application No. PCT/US2021/026609 mailed Jul. 15, 2021.

PROCESS AND APPARATUS FOR REMOVING SOLID CATALYST

The present invention relates to a process for the removal of spent catalyst from a microchannel reactor. The invention is particularly but not exclusively concerned with a process for the removal of spent Fischer-Tropsch catalyst from process microchannels of a Fischer-Tropsch reactor.

The Fischer-Tropsch process is widely used to generate fuels from carbon monoxide and hydrogen and can be represented by the equation:

$$(2n+1)H_2 + nCO \rightarrow C_nH_{2n+2} + nH_2O$$

This reaction is highly exothermic and is catalysed by a Fischer-Tropsch catalyst, typically a cobalt-based catalyst, under conditions of elevated temperature (typically at least 180° C., e.g. 200° C. or above) and pressure (e.g. at least 10 bar). A product mixture is obtained, and n typically encompasses a range from 1 to about 90. It is desirable to minimise methane selectivity, i.e. the proportion of methane (n=1) in the product mixture, and to maximise the selectivity towards C5 and higher (n≥5) paraffins, typically to a level of 90% or higher. It is also desirable to maximise the conversion of carbon monoxide. Preferably at least about 70% w/w of the product mixture is distributed between n=10 and n=30.

The hydrogen and carbon monoxide feedstock is normally synthesis gas.

During the Fischer-Tropsch reaction, the catalyst is gradually degraded, decreasing its effectiveness and requiring a gradual increase in temperature to maintain acceptable carbon monoxide conversion. This is described in Steynberg et al "Fischer-Tropsch catalyst deactivation in commercial microchannel reactor operation" Catalysis Today 299 (2018) pp 10-13.

For a period of time it is possible to regenerate the catalyst periodically, which can be done in situ by for example subjecting the catalyst to de-waxing, oxidation and reduction processes. However, there comes a point in the lifetime of the catalyst at which the accumulation of non-regenerable poisons such as sulphur and other non-regenerable deactivation mechanisms such as sintering cause the catalyst to become unviable. At this point the catalyst must be discharged from the reactor and replaced with fresh catalyst.

A number of different reactor types are known for carrying out Fischer-Tropsch synthesis, including fixed bed reactors, slurry bubble-column reactors (SBCR) and microchannel reactors (Rytter et al, "Deactivation and Regeneration of Commercial Type Fischer-Tropsch Co-Catalysts—A Mini-Review" Catalysts 2015, 5, pp 478-499 at pp 482-483).

Microchannel reactors are disclosed in our WO2016201218, which is incorporated by reference, and similarly in LeViness et al "Velocys Fischer-Tropsch Synthesis Technology—New Advances on State-of-the-Art" Top Catal 2014 57 pp 518-525. Such reactors have the particular advantage that very effective heat removal is possible, owing to the high ratio of heat exchange surface area to microchannel (and hence catalyst) volume.

However, microchannel reactors pose special challenges when it is required to discharge the catalyst. This is particularly the case with spent catalyst which may have undergone thousands of hours of plant operation and become deteriorated within the microchannels.

The present invention is particularly but not exclusively concerned with spent catalyst removal from microchannel reactors. Microchannel reactors typically comprise process layers containing microchannel architecture, for example in the form of a waveform corrugation situated within the process layers which effectively divides the process layers into linear arrays of process channels (process microchannels). The microchannel architecture is typically thinner than (and may be of a different material from) the pressure boundary and can be more easily damaged in harsh physical conditions such as may be required to discharge spent catalyst from the microchannels.

It has been found difficult to remove spent catalyst from the microchannels of such reactors, owing to their relatively small cross-section. Attempts to remove spent catalyst by mechanical means (e.g. hammering) or with steam or high pressure hot water have resulted in a poor recovery of catalyst, typically 50% or less of the original catalyst loading, as described in our US2009252658.

It is also known from US2009252658 to remove spent catalyst from microchannels of a Fischer-Tropsch reactor by placing an ultrasound-producing head in sonic contact with the microchannels and applying ultrasonic energy to the microchannels. However this method also has certain practical disadvantages. In particular, existing ultrasonic equipment and techniques have been found to remove spent catalyst too slowly and/or incompletely from microchannels.

The present invention provides a process for removing a particulate catalyst from a packed catalyst bed within process channels of a microchannel reactor, the process comprising airtight sealing a distal end of a linear array of process channels to form blocked process channels in the array, and directing a high velocity gas stream into the open proximal ends of the process channels, the velocity of the gas stream being sufficient to elevate the pressure in at least part of the blocked process channels to at least about 5 psig (34,473 Pa gauge), and thereby creating within the catalyst bed and/or between the catalyst bed and any open space adjacent the catalyst bed within the blocked process channels a pressure gradient effective to dislodge particulate catalyst from the catalyst bed.

In another aspect the present invention provides a process for removing a particulate catalyst from process channels of a microchannel reactor, the process comprising airtight sealing a distal end of a linear array of process channels to form blocked process channels in the array, and directing a high velocity gas stream into the open proximal ends of the process channels, the velocity of the gas stream being sufficient to elevate the pressure in at least part of the blocked process channels to at least about 5 psig (34,473 Pa gauge), and:

i. then removing the gas stream such that the concomitant release of pressure from the blocked process channel is effective to dislodge particulate catalyst from the process channels; and/or ii. in a channel partially discharged of catalyst creating by means of the gas stream a differential pressure between an undischarged channel portion and a discharged channel portion effective to dislodge particulate catalyst from the undischarged channel portion into the discharged channel portion.

The means provided for directing a high velocity gas stream into the open proximal ends of the process channels may conveniently be referred to as an "air knife", a term which is not to be construed as limiting in any way.

The air knife may be deployed at either end of the process channel, and may be relocated from one end to the other. The "proximal end" of the process channel is the end at which the "air knife" is deployed (and into which the high velocity gas stream is directed), and the "distal end" is the end which is blocked by airtight sealing. In a definitional sense these ends reverse position when the "air knife" is redeployed from one end of the process channel to the other.

Most suitably, step i) may be deployed initially when the process channel is fully or at least mostly undischarged; whilst step ii) is suitably deployed thereafter, and the particulate catalyst is dislodged into the discharged channel portion in loose form for subsequent removal from the process channel. Step ii) is believed to be effective in dislodging particulate catalyst from partially discharged process channels because the application of the gas stream into the channel causes the pressure within an undischarged portion of the channel to rise above that of a (downstream, substantially empty) discharged channel portion. This pressure differential causes the packed catalyst in the undischarged channel portion to become dislodged in loose form into the (downstream, substantially empty) discharged channel portion, from where it can subsequently be easily removed.

In the process of the invention an undischarged process channel may be partially discharged by means comprising step i) and subsequently further discharged by means comprising step ii). In this case the process may comprise in step ii) airtight sealing the opposite end of the process channel array from that which was sealed in step i) and directing the high velocity gas stream into the process channels at the opposite end from that in step i).

In some aspects of the invention the velocity of the gas stream is sufficient to elevate the pressure in at least part of the blocked process channels to from about 5 to about 20 psig, preferably from about 8 to about 15 psig, and may for example be at least about 10 psig. The pressure will not be uniform in the process channels unless they are at least substantially fully discharged of catalyst.

The relative rates at which pressure is elevated (and/or subsequently relieved) in the blocked process channels as between the packed catalyst bed and any open space adjacent the catalyst bed may also be an important factor in the successful dislodgment of spent catalyst from the channels. Preferably the pressure in the blocked process channels is elevated in the process of the invention by at least about 0.01 psi per ms, more preferably in the range of from about 0.05 to about 0.5 psi per ms. When, as in step i) described above, the gas stream is removed the pressure in the any open section of the process channels may decrease similarly quickly—for example by at least about 0.01 psi per ms, more preferably by in the range of from about 0.05 to about 0.5 psi per ms, facilitating dislodgment of the catalyst particles owing to the pressure differential created between a slowly-depressurising portion of the process channel (in the catalyst bed) and a rapidly-depressurising portion of the process channel (in any open space adjacent the catalyst bed). When, as in step ii) described above, the gas stream is directed into the channel causing the pressure within an undischarged portion of the channel to rise above that of a (downstream, substantially empty) discharged channel portion, this pressure differential may be created gradually by pressure rising in the catalyst bed before any concomitant pressure rise in an open space adjacent the end of the catalyst bed downstream from application of the gas stream.

It is thought that the mechanism of spent catalyst dislodgment is at least partly concerned with the inherent resistance to airflow through the closely packed particles. Once high pressure in the process channel is attained, the removal of the high velocity gas source creates a tendency of the pressurized gas in the process channel to leave the channel. The inherent flow resistance of the catalyst bed develops pressure gradient across the catalyst particles, that imparts force on the particles in an escape direction of the gas, resulting in catalyst dislodgement.

In step i) once high pressure gas has infiltrated the packed arrangement, that gas will then tend to escape (towards the proximal end) from the arrangement once the source of pressurized gas is removed. That escape tendency coupled with the resistance of the close packed particulate arrangement to through-flow causes the dislodgment of catalyst as the high pressure gas seeks to escape the close packed particulate arrangement at a higher rate than can be accommodated by the natural escape routes through the close packed arrangement. This can be most easily understood by considering a process channel which has been half discharged—with catalyst particles remaining only towards the undischarged distal end. As the gas stream is applied to the half discharged channel the pressure in the entire channel rises, including through its undischarged section. As the gas stream is removed, the pressure is immediately released from the discharged proximal end of the channel, and the subsequent escape of gas from the distal undischarged end causes dislodgment as described above.

The same principle may apply in step ii), with the difference that it may not be necessary to remove the gas stream in order to cause dislodgment. Once a channel has been partially discharged by means of step i) (or by some other means) it provides a channel which is close packed with catalyst at one of its ends but substantially empty (discharged) at the other. Airtight sealing of the substantially empty end and application of the gas stream to the packed end causes pressure to build up in the packed catalyst relative to the downstream empty channel portion. This pressure differential causes the packed catalyst in the undischarged channel portion to become dislodged in loose form into the (downstream, substantially empty) discharged channel portion, from where it can subsequently be easily removed.

Often microchannel reactors comprise delicate architecture within the process channels, for example waveform structures which accommodate the particulate catalyst. In this case to prevent or minimise damage to the process channel architecture the process of the invention may include locating spacer members adjacent to the openings of the proximal end of the linear array of process channels with the spacer members having at least one aperture or gap overlying the openings, and directing the high velocity gas stream through the at least one aperture or gap into the process channels.

The microchannel reactor typically comprises microchannel architecture creating the linear array of process channels.

Typically the particulate catalyst being removed in the process of the invention is a spent catalyst.

Preferably the reactor comprises layers of process channels. In the case in which delicate microchannel architecture is included in the process channels and hence the provision of a spacer member is desirable, preferably in that case each layer of process channels is provided with a said spacer member extending across the width of the layer. These features both facilitate rapid and effective catalyst removal.

Preferably the gas stream is moved transversely over the openings of successive layers of process channels. This feature facilitates rapid and effective catalyst removal.

Preferably the gas stream is generated by an elongate slot opening. The slot opening may be elongate in the direction of the said linear array of process channels and extend over two or more, preferably 10 or more, more preferably 20 or more, most preferably all the process channel openings of a layer of process channels. This feature equalises the pressures within the process channels and hence the forces acting on their walls, tending to protect the walls against damage by the gas stream.

The lateral dimension of the slot opening may be smaller than the corresponding lateral dimension of the aperture or gap of the spacer members, when present. This feature further enhances protection of the process channel walls.

In certain aspects of the invention the spacer members provide an important technical protective effect. In their absence the high velocity gas stream directed directly at the process channels has a tendency to damage any microchannel architecture of those channels. So for example if the microchannel architecture comprises corrugated inserts or waveforms such as those described in our WO2008030467 and incorporated herein by reference, these may be damaged if the spacer members used in the process of the invention are omitted.

A linear array of process channels constitutes a process layer. The process layers typically have a length, a height and a width, and a rectangular configuration. A typical length would be from about 100 mm to about 1000 mm, or from about 200 mm to about 600 mm. A typical height would be from about 3 mm to about 10 mm, or from about 5 mm to about 7 mm. A typical width would be from about 50 mm to about 800 mm, or from about 100 mm to about 300 mm. Microchannel architecture within the process layers typically creates a linear array of process channels (process microchannels) of approximate width from 0.5 to 2 mm or from 0.75 to 1.5 mm and approximately the same length and height as the process layers. Channels having a width of 2 mm or less are generally considered to be micro-process channels, or microchannels, with an especially high surface area: volume ratio which favours heat exchange with the reactor during production and facilitates process control and selectivity.

Preferably the velocity of the gas stream entering the open proximal ends of the process channels, or the aperture or gap of said spacer member, is at least about 250 m/s, preferably at least about 300 m/s, most preferably at least about 330 m/s, and may be supersonic. These values have been found to result in rapid and efficient build-up of pressure within the process channels for effective and rapid catalyst removal from those channels once the pressure is released; whilst the presence of the spacer members in certain aspects of the invention prevents damage to the microchannel architecture of the process channels.

The process channels are closed at their distal ends. This causes the pressure within the process channels to increase as the gas stream enters the channels at their proximal ends. Typically the pressure within the process channels before operation of the process of the invention will be ambient—i.e. atmospheric. The pressure within the process channel will typically rise during application of the gas stream from ambient to above 5 psig (34,473.5 Pa gauge), preferably up to or above 20 psig (137,895 Pa gauge).

The distal ends may optionally be sealed by any suitable means such as by heavy duty aluminium adhesive tape or by other sealant means.

Preferably the gas stream is air but any other suitable gas may be used, preferably inert.

The process channel openings are arranged in a linear array. Preferably the gas stream is generated by a nozzle with an elongate opening parallel to the linear array and is mounted for linear movement in a lateral direction on a carriage and the carriage is supported by the reactor. This feature enables a relatively compact apparatus which can be easily attached to and removed from the reactor.

Also provided in accordance with the invention there is provided a microchannel reactor comprising a linear array of process channels containing a particulate catalyst, the linear array being provided with means at its distal end for blocking the process channels in an airtight manner, and at its proximal end having openings with spacer members having at least one aperture or gap overlying the openings, and means for movably mounting a nozzle for directing a high velocity gas stream through the at least one aperture or gap into the process channels.

It is also contemplated within the scope of the invention that the simultaneous use of multiple high velocity gas stream nozzles may be used. In the event that multiple nozzles are used simultaneously, they may be used together to discharge catalyst from a single core of the reactor and/or they may be used to discharge catalyst simultaneously from multiple cores of the reactor.

Air flow through the nozzle may be pulsed or continuous.

Other preferred features are defined in the dependent claims.

Preferred embodiments of the invention are described below by way of example only with reference to FIGS. 1 to 7 of the accompanying drawings, wherein.

Details of one suitable microchannel Fisher-Tropsch reactor which can be cleared of catalyst by a process in accordance with the invention are given below with reference to FIGS. 1 to 3.

Figure 1:
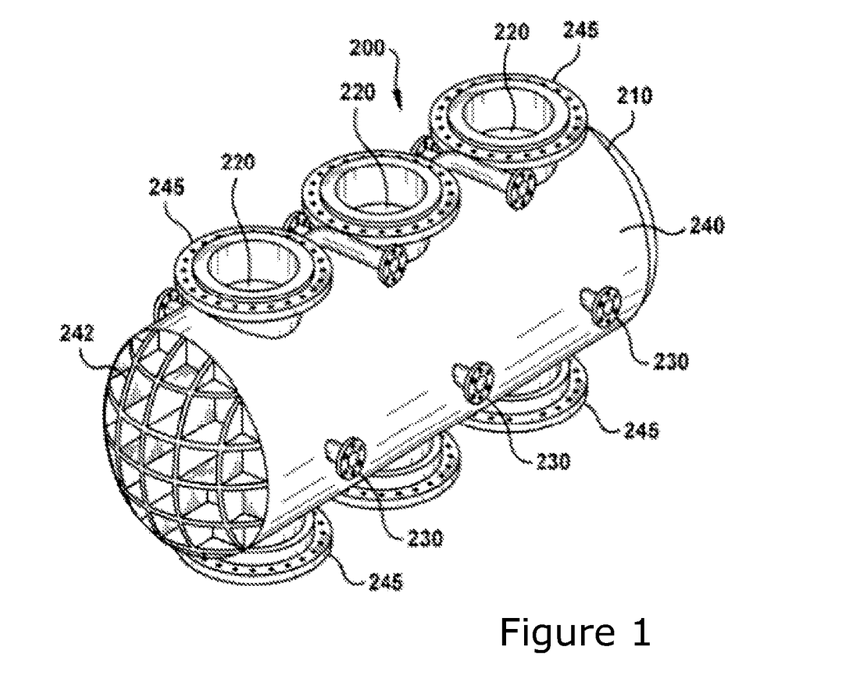
FIG. 1 is a is a diagrammatic perspective view of a microchannel reactor used in a preferred embodiment.

Referring to FIG. 1, microchannel reactor 200 comprises containment vessel 210 which contains or houses three microchannel reactor cores 220. In other embodiments, containment vessel 210 may be used to contain or house from 1 to about 16 microchannel reactor cores, or from 1 to about 8 microchannel reactor cores, or from 1 to about 4 microchannel reactor cores. The containment vessel 210 may be a pressurizable vessel. The containment vessel 210 includes inlets and outlets 245 allowing for the flow of reactants into and out of the microchannel reactor cores 220. Heat exchange fluid is supplied to the microchannel reactor cores through inlets 230 and recovered from similarly arranged outlets on the opposite side of the reactor.

Inlets 245 may be connected to a header or manifold (not shown) which is provided for flowing reactants to process microchannels in each of the microchannel reactor cores. Inlets 230 may be connected to a header or manifold (not shown) which is provided for flowing a heat exchange fluid, e.g. saturated water, to heat exchange channels in each of the microchannel reactor cores. One of the outlets 245 is connected to a manifold or footer (not shown) which provides for product flowing out of the process microchannels in each of the microchannel reactor cores. One of the heat exchange fluid outlets 230 may be connected to a manifold or footer (not shown) to provide for the flow of the heat exchange fluid out of the heat exchange channels in each of the microchannel reactor cores.

The containment vessel 210 may be constructed using any suitable material sufficient for countering operating pressures that may develop within the microchannel reactor cores. For example, the shell 240 and reinforcing ribs 242 of the containment vessel 210 may be constructed of cast or stainless steel. The flanges, couplings and pipes may be constructed of stainless steel for example. The containment vessel 210 may for example have a diameter of 1.5 m. The axial length of the containment vessel 210 may for example be 1.5 m for each reactor core located therein, ie 5.5 m for a four-core reactor.

Figure 2:
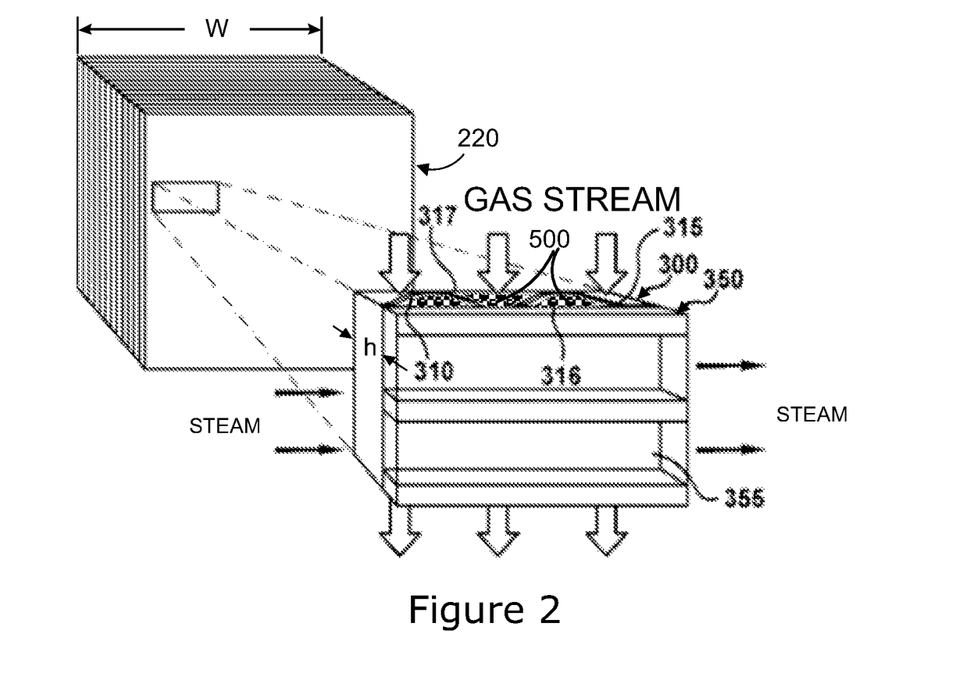
FIG. 2 is a diagrammatic perspective view of a reactor core utilised in the reactor of FIG. 1.

Referring to FIG. 2, the microchannel reactor core 220 contains a stack of alternating laminar units 300 of process microchannels 310 and laminar units 350 of heat exchange channels 355.

The microchannel reactor core 220 may optionally comprise a plurality of plates in a stack defining a plurality of process layers and a plurality of heat exchange layers, each plate having a peripheral edge, the peripheral edge of each plate or shim being welded to the peripheral edge of the next adjacent plate to provide a perimeter seal for the stack. This is shown in US20120095268, which is incorporated herein by reference.

The microchannel reactor core 220 may optionally have the form of a three-dimensional block which has six faces that are squares or rectangles. The microchannel reactor core 220 may optionally have the same cross-section along a length. The microchannel reactor core 220 may optionally be in the form of a parallel or cubic block or prism. The microchannel reactor core 220 may have a length, width and height of, 1 m for example.

Fischer-Tropsch catalyst 500 is positioned in the process microchannels 310 and may be in any suitable form, for example fixed beds of particulate solids.

Figure 3:
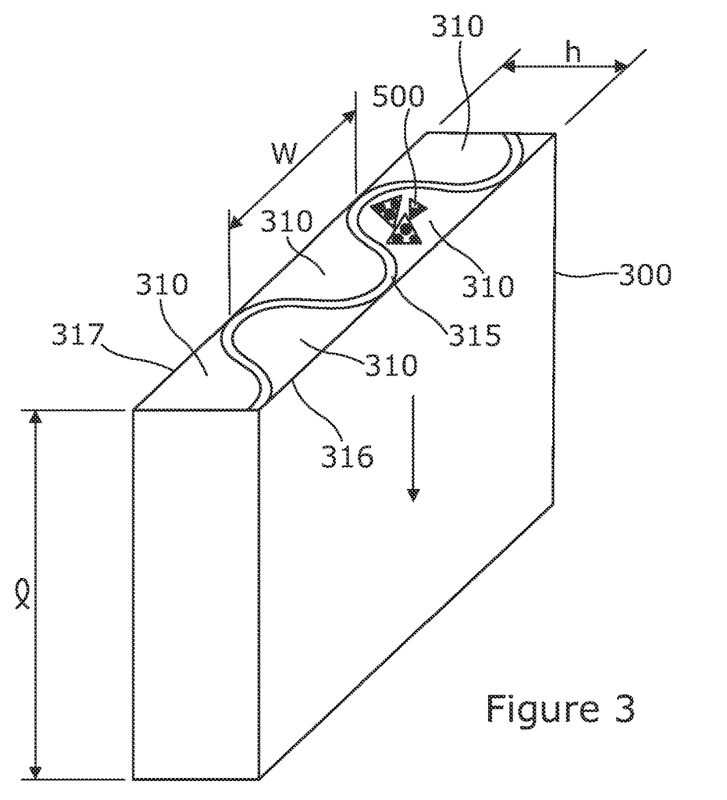
FIG. 3 is a diagrammatic perspective view of part of a process channel containing microchannel architecture used in the reactor core of FIGS. 1 and 2.

FIG. 3 shows microchannel architecture in the form of a corrugated sheet 315 sandwiched between plates 316 and 317 and defining process microchannels 310 on either side of sheet 315. For the sake of clarity, Fischer-Tropsch catalyst 500 is shown in only one of these microchannels, but in practice each microchannel 310 will be packed with Fischer-Tropsch catalyst 500. Further details of the construction are disclosed in WO2008030467, which is incorporated herein by reference The Fischer-Tropsch catalyst 500 may optionally comprise cobalt and a support. The catalyst may optionally have a cobalt loading in the range from about 10 to about 60% by weight, or from about 15 to about 60% by weight, or from about 20 to about 60% by weight, or from about 25 to about 60% by weight, or from about 30 to about 60% by weight, or from about 32 to about 60% by weight, or from about 35 to about 60% by weight, or from about 38 to about 60% by weight, or from about 40 to about 60% by weight, or from about 40 to about 55% by weight, or from about 40 to about 50% by weight of cobalt.

The Fischer-Tropsch catalyst 500 may optionally further comprise a noble metal. The noble metal may for example be one or more of Pd, Pt, Rh, Ru, Re, Ir, Au, Ag and Os. The noble metal may be one or more of Pt, Ru and Re. The noble metal may be Ru. As an alternative, or in addition, the noble metal may be Pt. The Fischer-Tropsch catalyst may optionally comprise from about 0.01 to about 30% in total of noble metal(s) (based on the total weight of all noble metals present as a percentage of the total weight of the catalyst precursor or activated catalyst), or optionally from about 0.05 to about 20% in total of noble metal(s), or optionally from about 0.1 to about 5% in total of noble metal(s), or optionally about 0.2% in total of noble metal(s).

The Fischer-Tropsch catalyst 500 may optionally include one or more other metal-based components as promoters or modifiers. These metal-based components may optionally also be present in the catalyst precursor and/or activated catalyst as carbides, oxides or elemental metals. A suitable metal for the one or more other metal-based components may for example be one or more of Zr, Ti, V, Cr, Mn, Ni, Cu, Zn, Nb, Mo, Tc, Cd, Hf, Ta, W, Re, Hg, Tl and the 4f-block lanthanides. Suitable 4f-block lanthanides may be La, Ce, Pr, Nd, Pm, Sm, Eu, Gd, Tb, Dy, Ho, Er, Tm, Yb and/or Lu. The metal for the one or more other metal-based components may for example be one or more of Zn, Cu, Mn, Mo and W. The metal for the one or more other metal-based components may for example be one or more of Re and Pt. The catalyst may optionally comprise from about 0.01 to about 10% in total of other metal(s) (based on the total weight of all the other metals as a percentage of the total weight of the catalyst precursor or activated catalyst), or optionally from about 0.1 to about 5% in total of other metals, or optionally about 3% in total of other metals.

The Fischer-Tropsch catalyst 500 may optionally be derived from a catalyst precursor which may be activated to produce the Fischer-Tropsch catalyst, for instance by heating the catalyst precursor in hydrogen and/or a hydrocarbon gas (e.g., methane), or in a hydrogen and/or hydrocarbon gas diluted with another gas, such as nitrogen and/or methane, to convert at least some of the carbides or oxides to elemental metal. In the active catalyst, the cobalt may optionally be at least partially in the form of its carbide or oxide.

The Fischer-Tropsch catalyst 500 may optionally include a catalyst support. The support may optionally comprise a refractory metal oxide, carbide, carbon, nitride, or mixture of two or more thereof. The support may optionally comprise alumina, zirconia, silica, titania, or a mixture of two or more thereof. The surface of the support may optionally be modified by treating it with silica, titania, zirconia, magnesia, chromia, alumina, or a mixture of two or more thereof. The material used for the support and the material used for modifying the support may be different. The support may optionally comprise silica and the surface of the silica may optionally be treated with an oxide refractory solid oxide such as titania for example. The material used to modify the support may be used to increase the stability (e.g. by decreasing deactivation) of the supported catalyst.

The catalyst support may optionally comprise up to about 30% by weight of the oxide (e.g., silica, titania, magnesia, chromia, alumina, zirconia or a mixture of two or more thereof) used to modify the surface of the support, or from about 1% to about 30% by weight, or from about 5% to about 30% by weight, or from about 5% to about 25% by weight, or from about 10% to about 20% by weight, or from about 12% to about 18% by weight, for example. The catalyst support may optionally be in the form of a structured shape, pellets or a powder. The catalyst support may optionally be in the form of particulate solids. While not wishing to be bound by theory, it is believed that the surface treatment provided for herein helps keep the Co from sintering during operation of the Fischer-Tropsch process.

The deactivation rate of the Fischer-Tropsch catalyst 500 may optionally be such that it can be used in a Fischer-Tropsch synthesis for more than about 300 hours, or more than about 3,000 hours, or more than about 12,000 hours, or more than about 15,000 hours, all before a catalyst rejuvenation or regeneration is required.

The Fischer-Tropsch catalyst 500 may optionally be used for an extended period (e.g. >300 hours) with a deactivation rate of less than about 1.4% per day, or less than about 1.2% per day, or between about 0.1% and about 1% per day, or between about 0.03% and about 0.15% per day.

The Fischer-Tropsch catalyst 500 may have any size and geometric configuration that fits within the process microchannels 310. The catalyst may optionally be in the form of particulate solids (e.g., pellets, powder, fibers, and the like) having a median particle diameter of from about 1 to about 1000 μm (microns), or from about 10 to about 750 μm, or from about 25 to about 500 μm. The median particle diameter may optionally be in the range from 50 to about 500 μm or from about 100 to about 500 μm, or from about 125 to about 400 μm, or from about 170 to about 300 μm. In one embodiment, the catalyst may be in the form of a fixed bed of particulate solids.

The microchannel reactor core 220 may for example contain 6 layers 350 of heat exchange channels 355.

Referring to FIG. 3, each process microchannel 310 may for example have a height (h) of 6.35 mm and a width (w) of 1 mm. The length of each process microchannel may for example be 610 mm.

Each unit or layer 300 of process microchannels 310 may for example have hundreds of process microchannels 310. The process microchannels 310 may have cross sections having any shape, for example, square, rectangle, circle, semi-circle, etc. The internal height of each process microchannel 310 may be considered to be the smaller of the internal dimensions normal to the direction of flow of reactants and product through the process microchannel.

Each unit or layer 350 of heat exchange channels 355 may for example have hundreds of heat exchange channels. The heat exchange channels 355 may be microchannels or they may have larger dimensions that would classify them as not being microchannels.

The microchannel reactor core 220 may be made of any material that provides sufficient strength, dimensional stability and heat transfer characteristics to permit operation of the desired process. These materials may for example include aluminium; titanium; nickel; platinum; rhodium; copper; chromium; alloys of any of the foregoing metals; brass; steel (e.g., stainless steel); quartz; silicon; or a combination of two or more thereof. Each microchannel reactor may optionally be constructed of stainless steel with one or more copper or aluminium waveforms being used for forming the channels.

The microchannel reactor core 220 may optionally be fabricated using known techniques including for example wire electro-discharge machining, conventional machining, laser cutting, photochemical machining, electrochemical machining, moulding, water jet, stamping, etching (for example, chemical, photochemical or plasma etching) and combinations thereof.

The microchannel reactor core 220 may optionally be constructed by forming plates with portions removed that allow flow passage. A stack of plates may for example be assembled via diffusion bonding, laser welding, diffusion brazing, conventional welding, additive manufacturing and similar methods to form an integrated device. The microchannel reactors may for example be assembled using a combination of plates and partial plates or strips. In this method, the channels or void areas may be formed by assembling strips or partial plates to reduce the amount of material required.

The microchannel reactor core 220 may optionally comprise a plurality of plates in a stack defining a plurality of process layers and a plurality of heat exchange layers, each plate having a peripheral edge, the peripheral edge of each plate or shim being welded to the peripheral edge of the next adjacent plate to provide a perimeter seal for the stack. This is shown in US20120095268, which is incorporated herein by reference.

The containment vessel 210 may optionally include a control mechanism to maintain the pressure within the containment vessel at a level that is at least as high as the internal pressure within the microchannel reactor cores 220. The internal pressure within the containment vessel 210 may optionally be in the range from about 10 to about 60 atmospheres, or from about 15 to about 30 atmospheres during the operation of a synthesis gas conversion process (e.g., Fischer-Tropsch process). The control mechanism for maintaining pressure within the containment vessel may optionally comprise a check valve and/or a pressure regulator. A check valve or regulator may optionally be programmed to activate at any desired internal pressure for the containment vessel. Either or both of these may be used in combination with a system of pipes, valves, controllers, and the like, to ensure that the pressure in the containment vessel 210 is maintained at a level that is at least as high as the internal pressure within the microchannel reactor cores 220. This is done in part to protect welds used to form the microchannel cores 220. A significant decrease in the pressure within the containment vessel 210 without a corresponding decrease of the internal pressure within the microchannel reactor cores 220 could result in a costly rupture of the welds within the microchannel reactor cores 220. A control mechanism may optionally be designed to allow for diversion of one or more process gases into the containment vessel in the event the pressure exerted by the containment gas decreases.

An apparatus and process for removing spent Fischer-Tropsch catalyst from the process microchannels 310 of the above reactor will now be described with reference to FIGS. 4 to 10.

Figure 4:
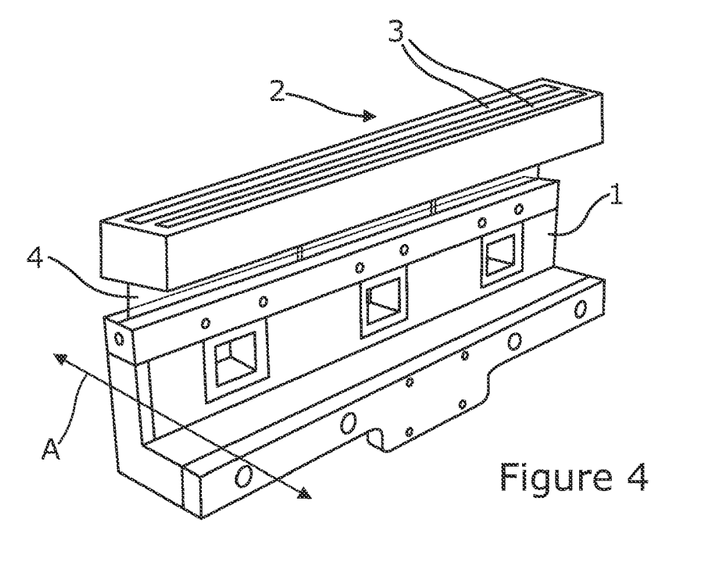
FIG. 4 is a diagrammatic perspective view of an air knife and a spacer member used to remove spent catalyst from the reactor core of FIG. 3.

Referring to FIG. 4, an air knife 1 is shown which is connected to a compressed air source (not shown) and has a slit with a width approximately equal to the width of a unit or layer 300 of process microchannels defining a high velocity air jet 4.

Figure 7:
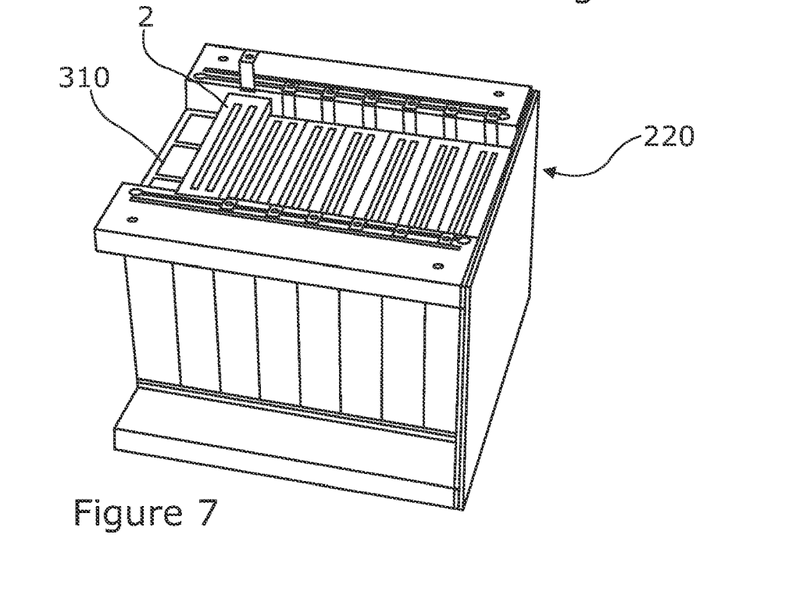
FIG. 7 is a diagrammatic perspective view from below showing the mounting of spacer members on the underside of the reactor core of FIG. 2.

An elongate protecting member or spacer 2 having two parallel slots 3 is shown aligned with the air knife 1 such that the air jet 4 passes through one of the parallel slots. The length of the air knife slit is equal to or slightly greater than the length of the slots 3 and both correspond to the full width W of the reactor cores 220 (FIG. 2). In use, the protecting member or spacer 2 is fixed against a row of openings of the process microchannels 310 and the air knife 1 is traversed in the direction A so that the air jet 4 passes through each slot 3 in turn. As best seen in FIG. 7, an array of such protecting members 2 is provided, so that the air jet 4 passes through successive slots of successive protecting members and thence into successive rows of process microchannels 310 of the reactor core 220.

Figure 6:
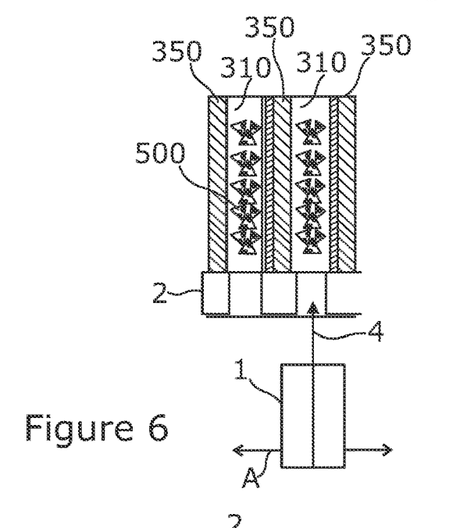
FIG. 6 is a diagrammatic side elevation showing the air knife of FIG. 4 traversing the layers of process microchannels of the reactor core of FIG. 2.

As best seen in FIG. 6, protecting members or spacers 2 are located under the coolant panels 350 and have their slots aligned with the process microchannels 310. Coolant panels 350 comprise coolant channels (not shown). The length of the spacer strips below the coolant panels extends across all the installed reactor cores which determine the width of the reactor. The depth (vertical direction in FIG. 6) of the protecting members is suitably from 10 mm to 50 mm—for example 25 mm. The alignment of the slots with the process microchannels also creates alignment between the spacer strips and the waveform-coolant panel contact points, which serves in use to protect those contact points from the full force of the gas stream directed through the body of the slots. The depth of the protecting members may also be suitably selected with reference to this most delicate location in the process channel.

Figure 5:
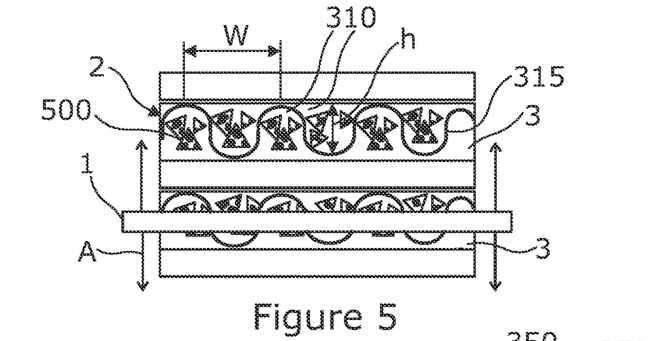
FIG. 5 is a diagrammatic elevation from below showing the air knife of FIG. 4 traversing the layers of process microchannels of the reactor core of FIG. 2.
Figure 6A:
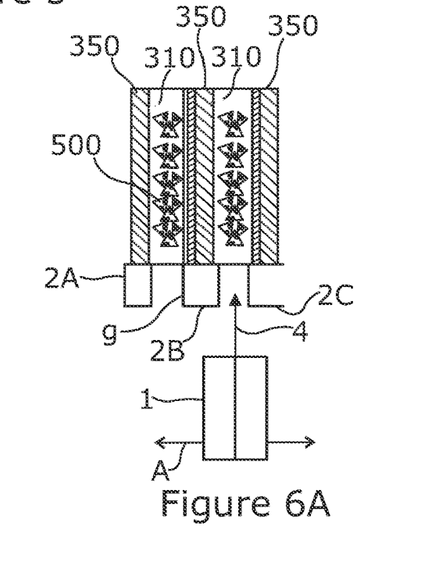

Referring to FIG. 6A, in a variant of the protective member the slots 3 could be dispensed with and each protective member 2 shown in FIG. 5 could be replaced by three narrower spaced apart protective members 2A, 2B and 2C individually located over respective coolant layers 350, with the air jet 4 directed through the gaps g between them.

As shown in FIG. 5, the air knife 1 traverses successive rows of process channels 310 and forces out catalyst 500. The width w of the micro-process channels is suitably 1 mm and the internal height h is suitably 6.35 mm.

The distance from the air knife slit to protecting member 2, when the air knife 1 is positioned in line with any given protecting member, is as small as possible within practical tolerances and typically between 0.5 and 19 mm. The length of the air knife slit is equal to or slightly greater than the width of the process layer for all cores corresponding to the full reactor width.

The dimensions of the air knife slit, and the upstream air pressure, are set so that the air flows at approaching or approximately sonic or even supersonic velocity through the slit. The slit width is typically in the range from 150 to 180 mm but could be up to or slightly greater than the width of the process layer.

In use, the air knife 1 is moved at a velocity of between 0.01 and 0.2 ms$^{-1}$, from one end of the reactor to the other and, after the full length of the underside of the reactor core 220 or a selected section of it has been traversed, the air knife travels back, at a similar velocity, to the starting position at the other end of the reactor core 220 or reactor core section. This motion is repeated, with continuous air flow through the air knife slit, until catalyst flow out of the channels stops. The reactor is then inspected to determine whether complete catalyst discharge has been achieved.

In relation to any partially undischarged channels the process of the invention in its step ii) may then be deployed. By unsealing the sealed ends of the process channels and then airtight sealing the opposite end of a linear array of process channels to form blocked process channels in the array, locating spacer members adjacent to the openings of the (now) unsealed end of the linear array of process channels with the spacer members having at least one aperture or gap overlying the openings, and directing a high velocity gas stream through the at least one aperture or gap into the process channels, the velocity of the gas stream being sufficient to elevate the pressure in the blocked process channels to at least about 5 psig in at least part of the blocked process channel, the concomitant build-up of pressure within the undischarged catalyst causes the packed catalyst in the undischarged channel portion to become dislodged in loose form into the (downstream, substantially empty) discharged channel portion. Preferably the pressure differential between the pressure within the packed catalyst bed and an adjacent unpacked section of process microchannel is at least about 1 psig, preferably at least about 2 psig.

As an alternative to step ii) the process of the invention in its step i) may be repeated by applying the process of the invention from the opposite side of the process channels—i.e. by unsealing the sealed ends of the process channels and then airtight sealing the opposite end of a linear array of process channels to form blocked process channels in the array, locating spacer members adjacent to the openings of the (now) unsealed end of the linear array of process channels with the spacer members having at least one aperture or gap overlying the openings, and directing a high velocity gas stream through the at least one aperture or gap into the process channels, the velocity of the gas stream being sufficient to elevate the pressure in the blocked process channels to at least about 5 psig, and then removing the gas stream such that the concomitant release of pressure from the blocked process channel is effective to dislodge particulate catalyst from the process channels.

If there are a few remaining channels containing some catalyst, then a non-automated method, such as solvent washing and/or mild physical encouragement, may be applied to those channels.

Figure 8:
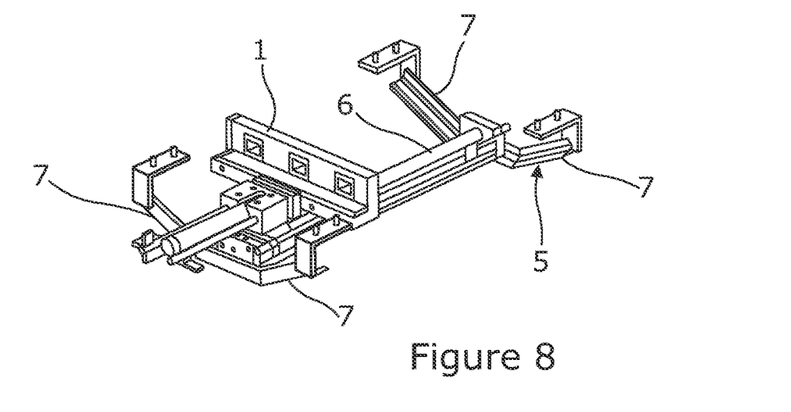
FIG. 8 is a diagrammatic perspective view of the air knife of FIGS. 4 and 6 mounted on a linear carriage assembly.
Figure 9:
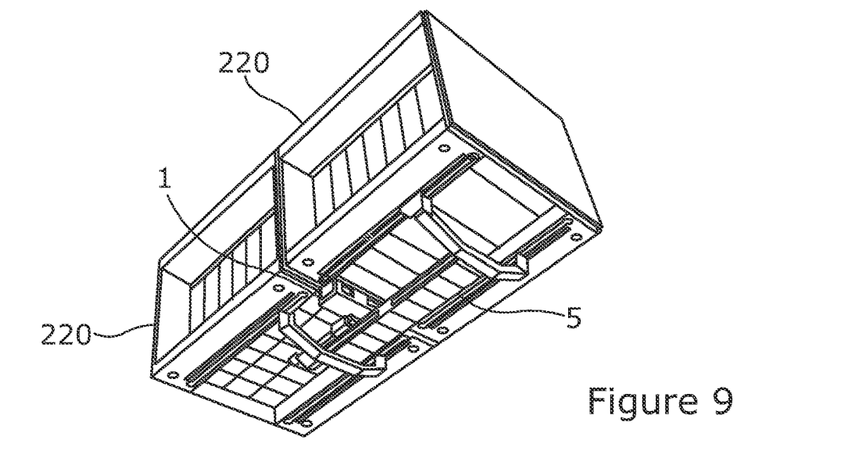
FIG. 9 is a diagrammatic perspective view of the linear carriage assembly mounted on the underside of the reactor core of FIG. 2, the carriage assembly being in the retracted configuration.
Figure 10:
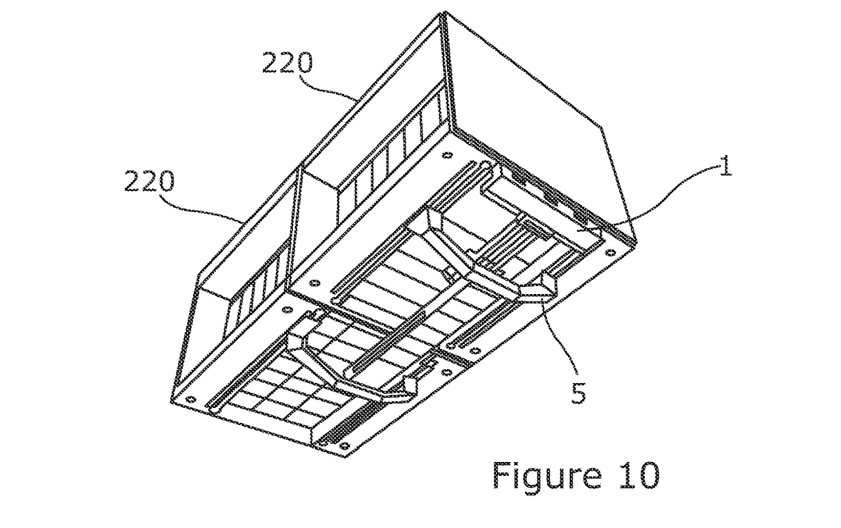
FIG. 10 is a diagrammatic perspective view of the linear carriage assembly mounted on the underside of the reactor core of FIG. 2, the carriage assembly being in the extended configuration.

As best seen in FIG. 8, the air knife 1 is carried on a slide 6 which is in turn mounted on four supporting arms 7. The extremities of these supporting arms have fixings (e.g. machine screws) for securing the resulting assembly 5 to the underside of reactor cores 220. The protecting members 2 are not shown in this Figure.

In operation, air passes continuously upwards through the air knife slit as the air knife 1 is moved along the length of the reactor to sequentially direct a flow of air to the gap between the spacer strips. The air knife slit extends across all the process microchannels 310 in 315.

As the air flow traverses the depth of the protective member 2 (FIGS. 5 and 6), to reach the process microchannels 310, the air blast impinges on the catalyst 500 in each reactor channel, increasing the pressure in the channel (which is blocked at its distal end) to above 5 psig, or up to or above 10 psig. Once the air knife passes across the channel, that pressure is released, causing at least some of the catalyst within the channel to be ejected in the released flow. The air knife continues to travel back and forth, at a preset velocity, along the length of the reactor, propelled by the automated air knife moving system, until no further catalyst is removed from the reactor.

The ejected catalyst may be collected in a chamber (not shown) installed beneath reactor core 200 into which a vacuum is drawn.

As best seen in FIGS. 2, 3 and 5, each row of process microchannels 310 is defined by a corrugated sheet 315 located between facing walls of the adjacent cooling panels 350. The corrugated sheets are fabricated from a heat conducting material, typically copper, and shaped to form multiple vertical reactor channels 310. The walls of the cooling panels are typically parallel stainless-steel plates. The parallel plates are usually internally cooled by a coolant fluid. In operation, the reactor channels are filled with a particulate catalyst material.

After the spent catalyst 500 has been removed it can be replaced with fresh catalyst The described catalyst removal method can be applied to chemical reactors other than Fischer-Tropsch reactors to remove spent catalyst therefrom.

The variants noted above can be combined in any combination.

The invention claimed is:

1. A process for removing a catalyst from a packed catalyst bed within process channels of a microchannel reactor, the process comprising airtight sealing a distal end of a linear array of process channels to form blocked process channels in the array, and directing a high velocity gas stream into the open proximal ends of the process channels, the velocity of the gas stream being sufficient to elevate the pressure in at least part of the blocked process channels to at least about 5 psig (34,473 Pa gauge), and thereby creating within the catalyst bed and/or between the catalyst bed and any open space adjacent the catalyst bed within the blocked process channels a pressure gradient effective to dislodge particulate catalyst from the catalyst bed.

2. A process for removing a particulate catalyst from process channels of a microchannel reactor, the process comprising airtight sealing a distal end of a linear array of process channels to form blocked process channels in the array, and directing a high velocity gas stream into the open proximal ends of the process channels, the velocity of the gas stream being sufficient to elevate the pressure in at least part of the blocked process channels to at least about 5 psig (34,473 Pa gauge), and
  i. then removing the gas stream such that the concomitant release of pressure from the blocked process channel is effective to dislodge particulate catalyst from the process channels; and/or
  ii. in a channel partially discharged of catalyst creating by means of the gas stream a differential pressure between an undischarged channel portion and a discharged channel portion effective to dislodge particulate catalyst from the undischarged channel portion into the discharged channel portion.

3. A process according to claim 1 comprising:
  i. removing the gas stream such that the concomitant release of pressure from the blocked process channel is effective to dislodge particulate catalyst from the process channels; and/or
  ii. in a channel partially discharged of catalyst creating by means of the gas stream a differential pressure between an undischarged channel portion and a discharged channel portion effective to dislodge particulate catalyst from the undischarged channel portion into the discharged channel portion.

4. The process according to claim 2 wherein in step ii) the particulate catalyst is dislodged into the discharged channel portion in loose form for subsequent removal from the process channel.

5. The process according to claim 2 wherein an undischarged process channel is partially discharged by means comprising step i) and subsequently further discharged by means comprising step ii).

6. The process according to claim 5 comprising in step ii) airtight sealing the opposite end of the process channel array from that which was sealed in step i) and directing the high velocity gas stream into the process channels at the opposite end from that in step i).

7. The process according to claim 2 wherein the gas stream is moved transversely over the openings of successive layers of process channels.

8. The process according to claim 2 wherein the reactor comprises layers of process channels.

9. The process according to claim 8 wherein each layer of process channels is provided with a spacer member extending across the width of the layer.

10. The process according to claim 2 comprising locating spacer members adjacent to the openings of the proximal end of the linear array of process channels with the spacer members having at least one aperture or gap overlying the openings, and directing the high velocity gas stream through the at least one aperture or gap into the process channels.

11. The process according to claim 10 wherein the gas stream is generated by an elongate slot opening, the lateral dimension of the slot opening being smaller than the corresponding lateral dimension of the aperture or gap of the spacer member.

12. The process according to claim 10 wherein the aperture or gap of the spacer member is elongate in the direction of said linear array of process channel openings and extends over two or more of the process channel openings of a layer of process channels.

13. The process according to claim 2 wherein the velocity of the gas stream entering the process channels is at least about 250 m/s.

14. The process according to claim 2 wherein the pressure within the process channels rises during application of the gas stream from ambient to up to or above 20 psig (137,895 Pa).

15. The process according to claim 2 wherein the gas stream is generated by a nozzle with an elongate opening parallel to the linear array of process channel openings and is mounted for linear movement in a lateral direction on a carriage and the carriage is supported by the reactor.

16. A microchannel reactor comprising a linear array of process channels containing a particulate catalyst, the linear array being provided with means at its distal end for blocking the process channels in an airtight manner, and at its proximal end having openings; and means for movably mounting a nozzle for directing a high velocity gas stream into the process channels.

17. A microchannel reactor according to claim 16 comprising spacer members having at least one aperture or gap overlying the openings, wherein the means are provided for directing the high velocity gas stream through the at least one aperture or gap into the process channels.

18. A microchannel reactor according to claim 16 comprising means for reversing the relative orientation of the blocking means and the nozzle mounting means as between respective ends of the process channels.

* * * * *